US012636964B2

(12) United States Patent
Farahmand et al.

(10) Patent No.: US 12,636,964 B2
(45) Date of Patent: May 26, 2026

(54) INTEGRATED BIDIRECTIONAL CHARGER AND INVERTER FOR ELECTRIC VEHICLES

(71) Applicant: Karma Automotive LLC, Irvine, CA (US)

(72) Inventors: Fazel Farahmand, Aliso Viejo, CA (US); Bradley Ketchel, Huntington Beach, CA (US)

(73) Assignee: Karma Automotive Inc., Irvine, CA (US)

( * ) Notice: Subject to any disclaimer, the term of this patent is extended or adjusted under 35 U.S.C. 154(b) by 789 days.

(21) Appl. No.: 18/053,095

(22) Filed: Nov. 7, 2022

(65) Prior Publication Data

US 2024/0149714 A1    May 9, 2024

(51) Int. Cl.
*B60L 53/14* (2019.01)
*H02J 3/32* (2026.01)
*H02M 3/335* (2006.01)
*H02P 27/08* (2006.01)

(52) U.S. Cl.
CPC .............. *B60L 53/14* (2019.02); *H02J 3/322* (2020.01); *H02M 3/33584* (2013.01); *H02P 27/08* (2013.01); *H02J 2207/20* (2020.01)

(58) Field of Classification Search
CPC ................................................. B60L 53/20–24
See application file for complete search history.

(56) References Cited

U.S. PATENT DOCUMENTS

| | | | | | |
|---|---|---|---|---|---|
| 4,920,475 | A | * | 4/1990 | Rippel | B60L 50/51 |
| | | | | | 363/137 |
| 9,520,806 | B2 | * | 12/2016 | Yamada | H01M 16/00 |
| 9,831,671 | B2 | * | 11/2017 | Yamada | B60L 15/2009 |
| 10,211,672 | B2 | * | 2/2019 | Mouridsen | H02J 9/062 |
| 10,230,254 | B1 | * | 3/2019 | Najmabadi | H02M 7/5387 |
| 10,507,716 | B2 | * | 12/2019 | Huh | B60K 6/26 |
| 11,167,654 | B2 | * | 11/2021 | King | H02J 7/00 |
| 2007/0247123 | A1 | * | 10/2007 | Bocchiola | H02M 7/5387 |
| | | | | | 323/222 |
| 2012/0049794 | A1 | | 3/2012 | Han et al. | |
| 2012/0062176 | A1 | * | 3/2012 | Hasan | B60L 50/16 |
| | | | | | 320/109 |

(Continued)

FOREIGN PATENT DOCUMENTS

GB          2592243 A      8/2021

*Primary Examiner* — Tynese V Mcdaniel
(74) *Attorney, Agent, or Firm* — Honigman LLP; Grant Griffith; Thomas Appledorn

(57) ABSTRACT

A method includes receiving an indication of a charging current received at an on-board charging circuit of a vehicle from a source having a charging voltage. The on-board charging circuit includes a multi-phase traction motor, an inverter electrically coupled to the multi-phase traction motor and including an upper set of switching elements and a lower set of switching elements, and an energy storage device (ESD) electrically coupled to the inverter and having a storage voltage. The method includes determining whether the charging voltage is greater than or equal to the storage voltage. When the charging voltage is greater than or equal to the storage voltage, the method includes instructing at least one switching element in the upper set to operate in an on state and all of the switching elements in the lower set in an off state to cause fast charging of the ESD using the charging current.

24 Claims, 12 Drawing Sheets

10

(56) References Cited

U.S. PATENT DOCUMENTS

| | | | | |
|---|---|---|---|---|
| 2015/0069936 A1* | 3/2015 | Jang | B60L 58/21 | |
| | | | 318/139 | |
| 2018/0254732 A1* | 9/2018 | Smolenaers | H02J 1/12 | |
| 2019/0126763 A1* | 5/2019 | Najmabadi | H02J 7/02 | |
| 2019/0291586 A1* | 9/2019 | Kim | B60L 15/007 | |
| 2019/0299793 A1* | 10/2019 | Kim | H02M 1/10 | |
| 2020/0161878 A1* | 5/2020 | Niimi | H02J 7/0016 | |
| 2020/0280190 A1* | 9/2020 | Lehn | B60L 53/12 | |
| 2020/0361323 A1* | 11/2020 | Chon | H02M 7/44 | |
| 2022/0410741 A1* | 12/2022 | Jeong | H02M 7/5395 | |
| 2024/0157824 A1* | 5/2024 | Hair | B60L 50/61 | |
| 2024/0317090 A1* | 9/2024 | Kubota | B60L 53/22 | |
| 2025/0119087 A1* | 4/2025 | Kim | H02P 27/06 | |
| 2025/0178426 A1* | 6/2025 | Masuda | B60L 50/60 | |
| 2025/0206121 A1* | 6/2025 | Masuda | B60L 1/02 | |
| 2025/0211063 A1* | 6/2025 | Masuda | B60L 50/61 | |
| 2025/0260350 A1* | 8/2025 | Kawanishi | H02P 21/16 | |

* cited by examiner

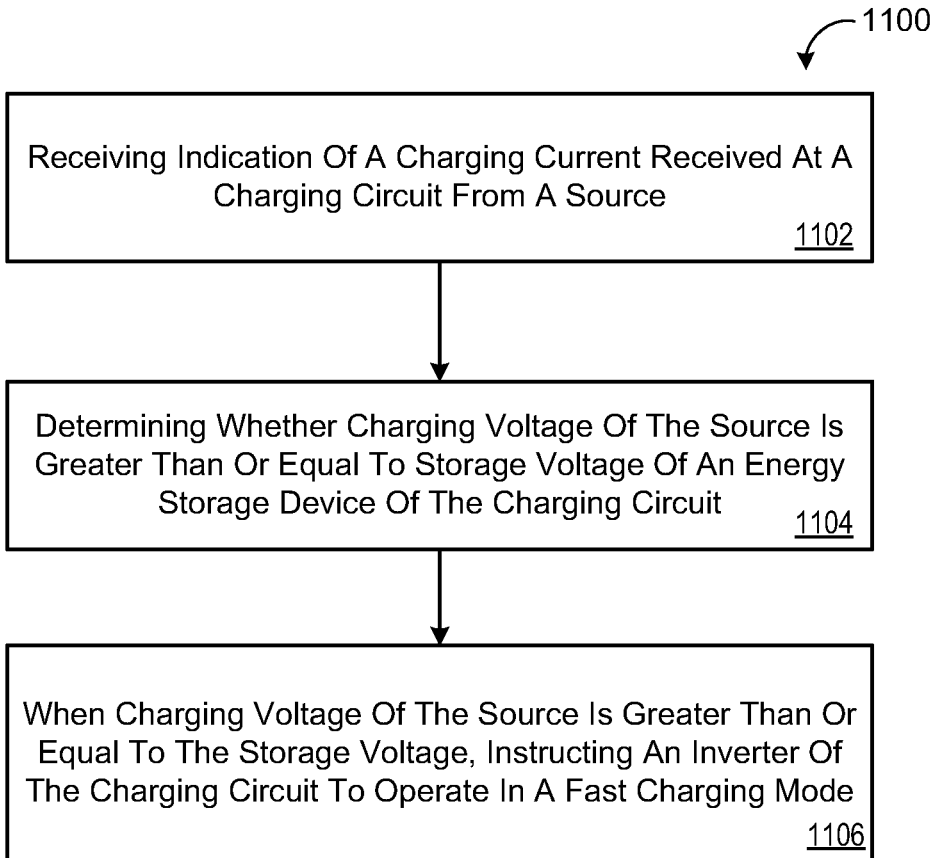

1100

Receiving Indication Of A Charging Current Received At A Charging Circuit From A Source

1102

Determining Whether Charging Voltage Of The Source Is Greater Than Or Equal To Storage Voltage Of An Energy Storage Device Of The Charging Circuit

1104

When Charging Voltage Of The Source Is Greater Than Or Equal To The Storage Voltage, Instructing An Inverter Of The Charging Circuit To Operate In A Fast Charging Mode

INTEGRATED BIDIRECTIONAL CHARGER AND INVERTER FOR ELECTRIC VEHICLES

TECHNICAL FIELD

This disclosure relates to on-board charging circuits for vehicles, and more particularly, on-board circuits having an integrated charger and inverter for electric vehicles.

BACKGROUND

Plug-in hybrid vehicles and battery powered electric vehicles typically include one or more batteries that store energy for powering, or at least partially powering, a drive system of the vehicle. Demand for shorter charging times and costs associated with charging stations has introduced the need for vehicles with higher battery voltages. That is, modern electric vehicles commonly include high voltage batteries.

These batteries may be charged at fast charging stations providing high voltage direct current (DC). However, a variety of charging stations providing both low and high voltage charging currents are available for charging electric vehicles. In other words, it is common for a charging station to provide a charging voltage that is different than the battery voltage of the electric vehicle, reducing the effectiveness of the charger and limiting the ease of charging the vehicle.

SUMMARY

One aspect of the disclosure provides a computer-implemented method that when executed on data processing hardware causes the data processing hardware to perform operations. The operations include receiving an indication of a charging current received at an on-board charging circuit of a vehicle from a source having a charging voltage. The on-board charging circuit includes a multi-phase traction motor, an inverter, and an energy storage device. The inverter is electrically coupled to the multi-phase traction motor and includes an upper set of switching elements and a lower set of switching elements. The energy storage device is electrically coupled to the inverter and has a storage voltage. The operations include determining whether the charging voltage of the source is greater than or equal to the storage voltage of the energy storage device. When the charging voltage of the source is greater than or equal to the storage voltage, the operations include instructing the inverter to operate in a fast charging mode by instructing at least one switching element in the upper set of switching elements to operate in an on state and all of the switching elements in the lower set of switching elements to operate in an off state to cause fast charging of the energy storage device using the charging current from the source.

Implementations of the disclosure may include one or more of the following optional features. In some implementations, the vehicle includes a charging port and the charging port feeds the charging current to the on-board charging circuit. In these implementations, the multi-phase traction motor includes a first phase electrically coupled to the charging port and electrically coupled to the inverter between a first switching element in the upper set of switching elements and a second switching element in the lower set of switching elements of the inverter. The multi-phase traction motor includes a second phase electrically coupled to the inverter between a third switching element in the upper set of switching elements and a fourth switching element in the lower set of switching elements of the inverter. The multi-phase traction motor includes a third phase electrically coupled to the inverter between a fifth switching element in the upper set of switching elements and a sixth switching element in the lower set of switching elements of the inverter.

In further implementations, instructing the inverter to operate in the fast charging mode includes instructing the first switching element in the upper set of switching elements to operate in the on state, instructing the third and fifth switching elements in the upper set of switching elements to each operate in the off state, and instructing the second, fourth, and sixth switching elements in the lower set of switching elements to each operate in the off state. In some further implementations, the operations further include, when the charging voltage of the source is less than the storage voltage, instructing the inverter to operate in a boost charging mode. Instructing the inverter to operate in the boost charging mode includes instructing the third, and fifth switching elements in the upper set of switches and the fourth and sixth switching elements in the lower set of switching elements to operate in a pulse width modulation mode (PWM mode), where the third, fourth, fifth, and sixth switching elements are selectively switched between operating in the on state and the off state, and instructing the first switching element in the upper set of switching elements and the second switching element in the lower set of switching elements to each operate in the off state.

In some examples, the vehicle includes a charging port and the charging port feeds the charging current to the on-board charging circuit. In these examples, the multi-phase traction motor includes a first phase electrically coupled to the charging port of the vehicle and electrically coupled to the inverter between a first switching element in the upper set of switching elements and a second switching element in the lower set of switching elements of the inverter. The multi-phase traction motor includes a second phase electrically coupled to the charging port and electrically coupled to the inverter between a third switching element in the upper set of switching elements and a fourth switching element in the lower set of switching elements of the inverter. The multi-phase traction motor includes a third phase electrically coupled to the inverter between a fifth switching element in the upper set of switching elements and a sixth switching element in the lower set of switching elements of the inverter.

In further examples, instructing the inverter to operate in the fast charging mode includes instructing the first switching element and the third switching element in the upper set of switching elements to operate in the on state, instructing the fifth switching element in the upper set of switching elements to operate in the off state, and instructing the second, fourth, and sixth switching elements in the lower set of switching elements to each operate in the off state. In some further examples, the operations further include, when the charging voltage of the source is less than the storage voltage, instructing the inverter to operate in a boost charging mode. Instructing the inverter to operate in the boost charging mode includes instructing the fifth switching element in the upper set of switching elements and the sixth switching element in the lower set of switching elements to operate in a pulse width modulation mode (PWM mode), where the fifth and sixth switching elements are selectively switched between operating in the on state and the off state, and instructing the first switching element and the third switching element in the upper set of switching elements to each operate in the off state. In some further examples, a switch is disposed at the second phase of the multi-phase traction motor. The switch selectively adjusts the second phase between a first state, where the second phase is electrically coupled to the charging port, and a second state, where the second phase is electrically coupled to the inverter.

In some implementations, the vehicle includes a charging port electrically coupled to the on-board charging circuit. In these implementations, receiving the charging current from the source includes receiving an alternating current (AC) at the on-board charging circuit via the charging port, and converting, using a rectifier electrically coupled between the charging port and the multi-phase traction motor, the AC to direct current (DC). Receiving the charging current from the source may include receiving a DC from the source via a charging port. The charging port electrically coupling the on-board charging circuit to the source.

Optionally, the switching elements in the upper set of switching elements and the switching elements in the lower set of switching elements include metal-oxide-semiconductor field-effect transistors or insulated-gate bipolar transistors. The multi-phase traction motor may include one of a brushless DC motor, a brushed DC motor, an induction motor, a doubly fed induction motor, or a synchronous reluctance motor. In some examples, the on-board charging circuit includes a bidirectional charging circuit configured to, when the on-board charging circuit is electrically coupled to an energy sink, provide energy from the energy storage device to the energy sink.

Another aspect of the disclosure provides a vehicle including an on-board charging circuit. The on-board charging circuit includes a multi-phase traction motor, an inverter, and an energy storage device. The inverter is electrically coupled to the multi-phase traction motor and includes an upper set of switching elements and a lower set of switching elements. The energy storage device is electrically coupled to the inverter and has a storage voltage. The vehicle includes memory hardware storing instructions that, when executed on data processing hardware in communication with the memory hardware, cause the data processing hardware to perform operations. The operations include receiving an indication of a charging current received at the on-board charging circuit from a source having a charging voltage. The operations include determining whether the charging voltage of the source is greater than or equal to the storage voltage of the energy storage device. When the charging voltage of the source is greater than or equal to the storage voltage, the operations include instructing the inverter to operate in a fast charging mode by instructing at least one switching element in the upper set of switching elements to operate in an on state and all of the switching elements in the lower set of switching elements to operate in an off state to cause fast charging of the energy storage device using the charging current from the source. This aspect may include one or more of the following optional features.

In some implementations, the vehicle includes a charging port and the charging port feeds the charging current to the on-board charging circuit. In these implementations, the multi-phase traction motor includes a first phase electrically coupled to the charging port and electrically coupled to the inverter between a first switching element in the upper set of switching elements and a second switching element in the lower set of switching elements of the inverter. The multi-phase traction motor includes a second phase electrically coupled to the inverter between a third switching element in the upper set of switching elements and a fourth switching element in the lower set of switching elements of the inverter. The multi-phase traction motor includes a third phase electrically coupled to the inverter between a fifth switching element in the upper set of switching elements and a sixth switching element in the lower set of switching elements of the inverter.

In further implementations, instructing the inverter to operate in the fast charging mode includes instructing the first switching element in the upper set of switching elements to operate in the on state, instructing the third and fifth switching elements in the upper set of switching elements to each operate in the off state, and instructing the second, fourth, and sixth switching elements in the lower set of switching elements to each operate in the off state. In some further implementations, the operations further include, when the charging voltage of the source is less than the storage voltage, instructing the inverter to operate in a boost charging mode. Instructing the inverter to operate in the boost charging mode includes instructing the third, and fifth switching elements in the upper set of switches and the fourth and sixth switching elements in the lower set of switching elements to operate in a pulse width modulation mode (PWM mode), where the third, fourth, fifth, and sixth switching elements are selectively switched between operating in the on state and the off state, and instructing the first switching element in the upper set of switching elements and the second switching element in the lower set of switching elements to each operate in the off state.

In some examples, the vehicle includes a charging port and the charging port feeds the charging current to the on-board charging circuit. In these examples, the multi-phase traction motor includes a first phase electrically coupled to the charging port of the vehicle and electrically coupled to the inverter between a first switching element in the upper set of switching elements and a second switching element in the lower set of switching elements of the inverter. The multi-phase traction motor includes a second phase electrically coupled to the charging port and electrically coupled to the inverter between a third switching element in the upper set of switching elements and a fourth switching element in the lower set of switching elements of the inverter. The multi-phase traction motor includes a third phase electrically coupled to the inverter between a fifth switching element in the upper set of switching elements and a sixth switching element in the lower set of switching elements of the inverter.

In further examples, instructing the inverter to operate in the fast charging mode includes instructing the first switching element and the third switching element in the upper set of switching elements to operate in the on state, instructing the fifth switching element in the upper set of switching elements to operate in the off state, and instructing the second, fourth, and sixth switching elements in the lower set of switching elements to each operate in the off state. In some further examples, the operations further include, when the charging voltage of the source is less than the storage voltage, instructing the inverter to operate in a boost charging mode. Instructing the inverter to operate in the boost charging mode includes instructing the fifth switching element in the upper set of switching elements and the sixth switching element in the lower set of switching elements to operate in a pulse width modulation mode (PWM mode), where the fifth and sixth switching elements are selectively switched between operating in the on state and the off state, and instructing the first switching element and the third switching element in the upper set of switching elements to each operate in the off state. In some further examples, a switch is disposed at the second phase of the multi-phase traction motor. The switch selectively adjusts the second phase between a first state, where the second phase is electrically coupled to the charging port, and a second state, where the second phase is electrically coupled to the inverter.

In some implementations, the vehicle includes a charging port electrically coupled to the on-board charging circuit. In these implementations, receiving the charging current from the source includes receiving an AC at the on-board charging circuit via the charging port, and converting, using a rectifier electrically coupled between the charging port and the multi-phase traction motor, the AC to DC. Receiving the charging current from the source may include receiving a DC from the source via a charging port. The charging port electrically coupling the on-board charging circuit to the source.

Optionally, the switching elements in the upper set of switching elements and the switching elements in the lower set of switching elements include metal-oxide-semiconductor field-effect transistors or insulated-gate bipolar transistors. The multi-phase traction motor may include one of a brushless DC motor, a brushed DC motor, an induction motor, a doubly fed induction motor, or a synchronous reluctance motor. In some examples, the on-board charging circuit includes a bidirectional charging circuit configured to, when the on-board charging circuit is electrically coupled to an energy sink, provide energy from the energy storage device to the energy sink.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 11 is a flowchart of an exemplary arrangement of operations for a method of controlling an on-board charging circuit to operate in a fast charging mode or a boost charging mode.

Like reference symbols in the various drawings indicate like elements.

DETAILED DESCRIPTION

Figure 1:
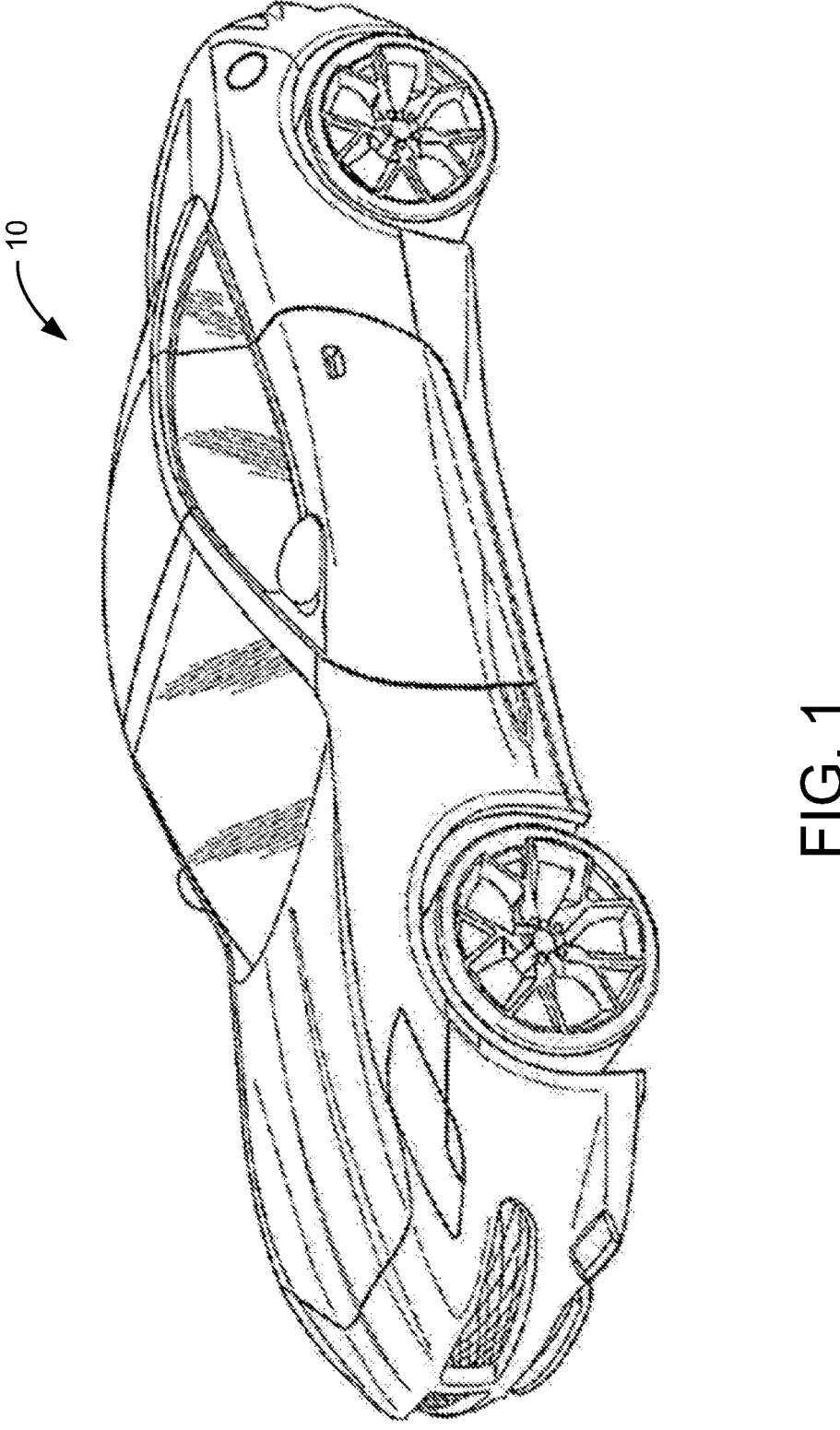
FIG. 1 is a perspective view of a battery-powered vehicle.
Figure 2:
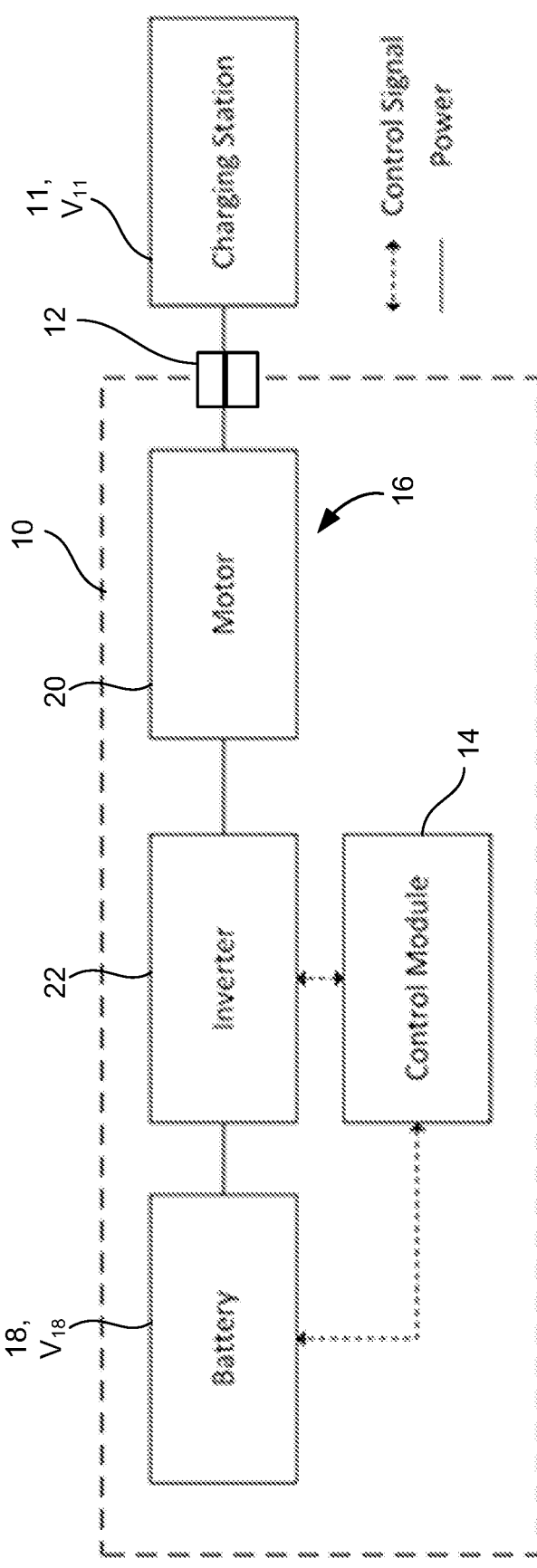
FIG. 2 is a schematic view of an on-board charging circuit of the battery-powered vehicle of FIG. 1.

Referring to FIGS. 1 and 2, a battery-powered vehicle 10, such as an electric vehicle or a plug-in hybrid vehicle, is configured to electrically couple to a charging source 11, such as a charging station or other electrical outlet electrically connected to an electrical grid, and receives a charging current from the source 11 that electrically charges a battery or energy storage device (ESD) 18 of the vehicle 10. For example, the vehicle 10 includes a charging port 12 that electrically couples to the charging source 11 and feeds the charging current from the source 11 to the ESD 18. The charging source 11 may also include another vehicle electrically coupled to the vehicle 10 and capable of providing a charging current for charging the ESD 18 of the vehicle 10.

The ESD 18 is part of an on-board charging circuit 16 of the vehicle 10, where the on-board charging circuit 16 is configured to receive the charging current from the charging source 11 to charge the ESD 18. In the example shown, the on-board charging circuit 16 also includes a multi-phase traction motor 20 electrically coupled to the charging port 12 and an inverter 22 electrically coupled between the multi-phase traction motor 20 and the ESD 18. A control module or controller 14 is disposed at the vehicle 10 and is in communication with the on-board charging circuit 16 to control charging of the ESD 18. As described further below, the control module 14 controls the on-board charging circuit 16 to operate in a fast charging mode or a boost charging mode based on a charging voltage $V_{11}$ of the source 11 and a storage voltage $V_{18}$ of the ESD 18.

The control module 14 includes data processing hardware 1210 (FIG. 12) and memory hardware 1220 (FIG. 12) in communication with the data processing hardware 1210. The memory hardware 1220 stores instructions that, when executed on the data processing hardware 1210, cause the data processing hardware 1210 to perform operations. For example, the control module 14 stores instructions for operating the on-board charging circuit 16 in the fast charging mode or the boost charging mode when the on-board charging circuit 16 is electrically coupled to the charging source 11 to charge the ESD 18. When the on-board charging circuit 16 is electrically coupled to the charging source 11 to charge the ESD 18, the control module 14 receives an indication that the on-board charging circuit 16 is receiving a charging current from the source 11. The control module 14 may also receive/obtain a value of the charging voltage $V_{11}$ of the source 11 and a value of the storage voltage $V_{18}$ of the ESD 18. The control module 14 may also control the circuit 16 to electrically power the vehicle 10 from energy stored in the ESD 18. Moreover, the on-board charging circuit 16 may be bidirectional and the control module 14 may control the circuit 16 to electrically power an external energy sink 13 that is remote from the vehicle 10 (such as another vehicle, an electric grid, or an isolated building) from energy stored in the ESD 18 (FIGS. 7-10).

The multi-phase traction motor 20 is electrically coupled to the charging source 11 (via the charging port 12) and is electrically coupled to the inverter 22. The multi-phase traction motor 20, when the on-board charging circuit 16 is not electrically coupled to the charging source 11, may operate in a traction mode, where the multi-phase traction motor 20 receives power from the ESD 18 to power the vehicle 10. Thus, when the on-board charging circuit 16 is electrically coupled to the charging source 11, charging current feeds through the multi-phase traction motor 20 to the inverter 22 and the ESD 18 and, when the on-board charging circuit 16 is not electrically coupled to the charging source 11, the multi-phase traction motor 20 may be electrically operated to drive the vehicle 10. The multi-phase traction motor 20 may include a brushless direct current (DC) motor, a brushed DC motor, an induction motor, a doubly fed induction motor, a synchronous reluctance motor, or any suitable electrically operated motor.

The ESD 18 is rechargeable and stores energy for consumption to drive the vehicle 10 via the multi-phase traction motor 20. Because the ESD 18 provides DC, the inverter 22 is electrically coupled between the ESD 18 and the multi-phase traction motor 20 to convert the DC to alternating current (AC) when electrically powering the multi-phase traction motor 20 in traction mode to drive the vehicle 10.

The ESD 18 has a nominal storage voltage $V_{18}$, such as 3 volts, 4 volts, 100 volts, 200 volts, 400 volts, 800 volts, or more.

The inverter 22 is electrically coupled between the ESD 18 and the multi-phase traction motor 20 and operation of the inverter 22 is controlled by the control module 14 when the on-board charging circuit 16 is electrically coupled to the charging source 11 as the charging current feeds through the multi-phase traction motor 20 and the inverter 22 to the ESD 18. To determine how to control the inverter 22 and the on-board charging circuit 16, the control module 14 receives an indication (e.g., via sensing, detecting, receiving, or determining) of the charging voltage $V_{11}$ and the storage voltage $V_{18}$, and compares the charging voltage $V_{11}$ to the storage voltage $V_{18}$ to determine whether the charging voltage $V_{11}$ is less than the storage voltage $V_{18}$ or greater than or equal to the storage voltage $V_{18}$. When the charging voltage $V_{11}$ is less than the storage voltage $V_{18}$, the control module 14 instructs the inverter 22 to operate in a boost charging mode to increase the voltage provided to the ESD 18 from the inverter 22 (e.g., to equal or exceed the storage voltage $V_{18}$). When the charging voltage $V_{11}$ is greater than or equal to the storage voltage $V_{18}$, the control module 14 instructs the inverter 22 to operate in a fast charging mode to rapidly charge the ESD 18 using the charging current from the charging source 11. The charging current from the charging source 11 may be AC or DC and have a nominal charging voltage $V_{11}$, such as 110 volts, 220 volts, 400 volts, 600 volts, 800 volts, or more.

As shown in FIGS. 3-10, the inverter 22 includes a plurality of switches or switching elements 24, 24a—n arranged into an upper set of switching elements 24U and a lower set of switching elements 24L. In the example shown, the upper set of switching elements 24U includes a first switching element 24a, a third switching element 24c, and a fifth switching element 24e, and the lower set of switching elements 24L includes a second switching element 24b, a fourth switching element 24d, and a sixth switching element 24f. Each of the switching elements 24 is respectively adjustable or switchable to operate between an ON state and an OFF state. Moreover, the switching elements 24 of the inverter 22 are operable in a pulse width modulation mode (PWM mode), where two or more of the switching elements 24 are selectively switched between operating in the ON state and operating in the OFF state. The inverter 22 may include any suitable type of switching elements 24 for selectively amplifying or switching the electric current from the inverter 22. For example, the switching elements 24 may include metal-oxide-semiconductor field-effect transistors (MOSFETs) or insulated-gate bipolar transistors (IGBTs).

Furthermore, the multi-phase traction motor 20 includes a plurality of phases or windings 30, 30a—n, including a first phase 30a, a second phase 30b, and a third phase 30c. When the multi-phase traction motor 20 operates in traction mode, the control module 14 instructs each of the switching elements 24 of the inverter 22 to operate in the PWM mode.

To operate in the fast charging mode, when the charging voltage $V_{11}$ is greater than or equal to the storage voltage $V_{18}$, the control module 14 instructs the inverter 22 to operate at least one switching element 24 in the upper set of switching elements 24U in the ON state and to operate all of the switching elements 24 in the lower set of switching elements 24L in the OFF state. To operate in the boost charging mode, when the charging voltage $V_{11}$ is less than the storage voltage $V_{18}$, the control module 14 instructs the inverter 22 to operate at least one switching element 24 in the upper set of switching elements 24U and at least one switching element 24 in the lower set of switching elements 24L in the PWM mode, where the at least one switching element 24 in the upper set of switching elements 24U and the at least one switching element 24 in the lower set of switching elements 24L are selectively switched between the ON state and the OFF state. In the boost charging mode, the control module 14 instructs the switching elements 24 that are not operating in the PWM mode to operate in the OFF state.

Figure 3:
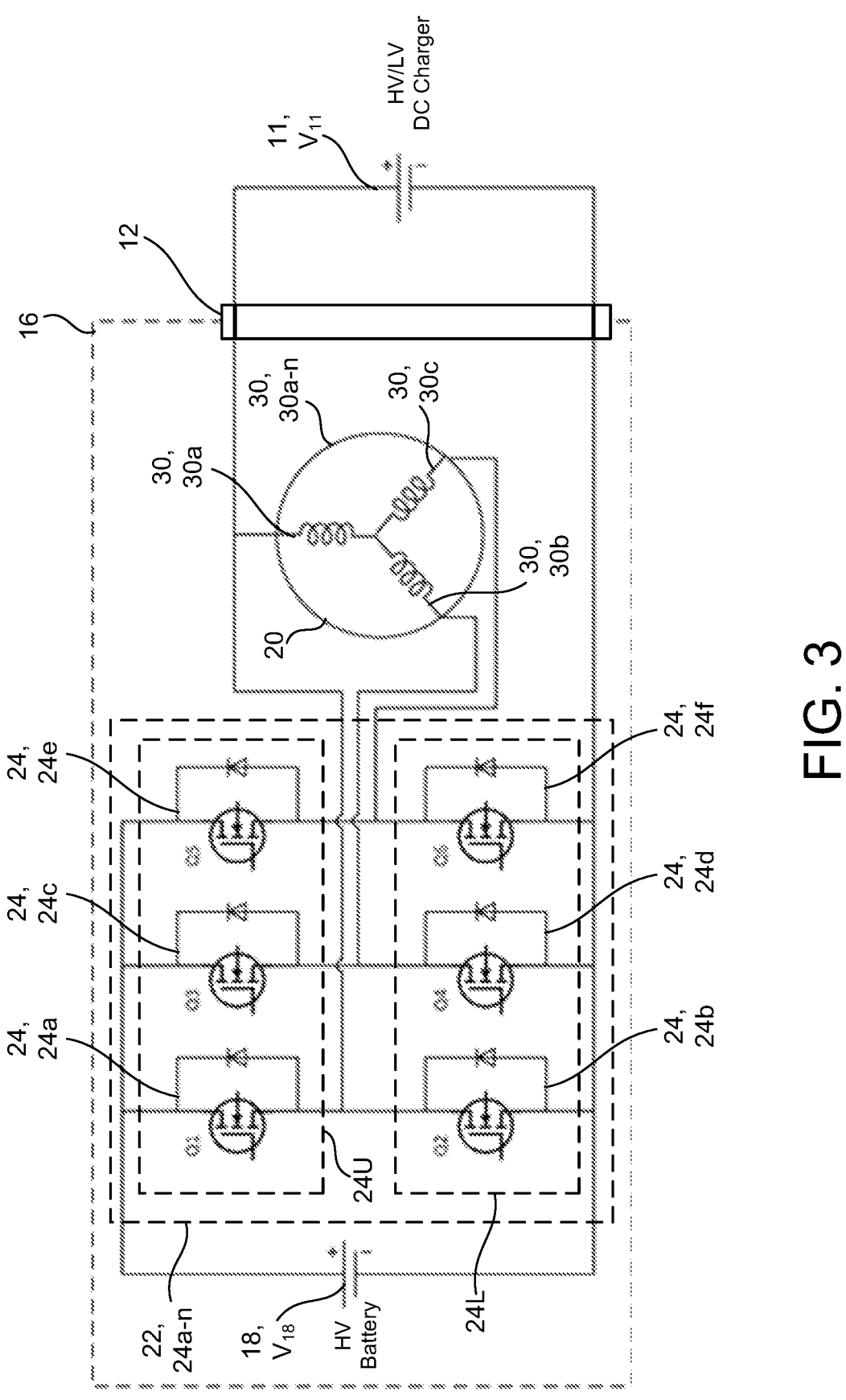
FIGS. 3-10 are schematic views of the on-board charging circuit of FIG. 2.

Referring to FIG. 3, the charging source 11 having charging voltage $V_{11}$ electrically couples to the on-board charging circuit 16 to deliver charging current to the on-board charging circuit 16. The multi-phase traction motor 20 includes one phase 30 electrically coupled to the charging source 11 and to the inverter 22 and two phases 30 electrically coupled to the inverter 22. That is, the first phase 30a is electrically coupled to the charging source 11 and to the inverter 22 between the first switching element 24a and the second switching element 24b, the second phase 30b is electrically coupled to the inverter 22 between the third switching element 24c and the fourth switching element 24d, and the third phase 30c is electrically coupled to the inverter 22 between the fifth switching element 24e and the sixth switching element 24f. The ESD 18 electrically coupled to the inverter 22 has a storage voltage $V_{18}$ of 800 volts (but may have any suitable storage voltage $V_{18}$), and the on-board charging circuit 16 may receive charging current from the charging source 11 having charging voltage $V_{11}$ that is less than the storage voltage $V_{18}$ (e.g., 400 volts) or that is greater than or equal to the storage voltage $V_{18}$ (e.g., 800 volts or more). In the example shown in FIG. 3, the charging source 11 provides DC charging current to the on-board charging circuit 16.

When operating in the fast charging mode, the control module 14 instructs the inverter 22 to operate the first switching element 24a in the upper set of switching elements 24U in the ON state, and to operate the third switching element 24c and the fifth switching element 24e in the upper set of switching elements 24U in the OFF state. Further when operating in the fast charging mode, the control module 14 instructs the inverter 22 to operate the second switching element 24b, the fourth switching element 24d, and the sixth switching element 24f in the lower set of switching elements 24L in the OFF state. Thus, the control module 14 detects that the charging voltage $V_{11}$ is greater than or equal to the storage voltage $V_{11}$ and instructs the inverter 22 accordingly so that the charging port 12 directly feeds charging current to the ESD 18 through the first switching element 24a operating in the ON state.

When operating in the boost charging mode, the control module 14 instructs the inverter 22 to operate the third switching element 24c and the fifth switching element 24e in the upper set of switching elements 24U and the fourth switching element 24d and the sixth switching element 24f in the lower set of switching elements 24L in the PWM mode. In other words, the control module 14 instructs the inverter 22 to selectively switch the third switching element 24c, the fourth switching element 24d, the fifth switching element 24e, and the sixth switching element 24f between operating in the ON state and operating in the OFF state. Moreover when operating in the boost charging mode, the control module 14 instructs the inverter 22 to operate the first switching element 24a in the upper set of switching elements 24U and the second switching element 24b in the lower set of switching elements 24L in the OFF state. Thus, the control module 14 detects that the charging voltage $V_{11}$ is less than the storage voltage $V_{11}$ and instructs the inverter 22 accordingly so that the voltage provided to the ESD 18 is boosted from (i.e., greater than) the charging voltage V$_{11}$ received at the charging port 12.

Figure 4:
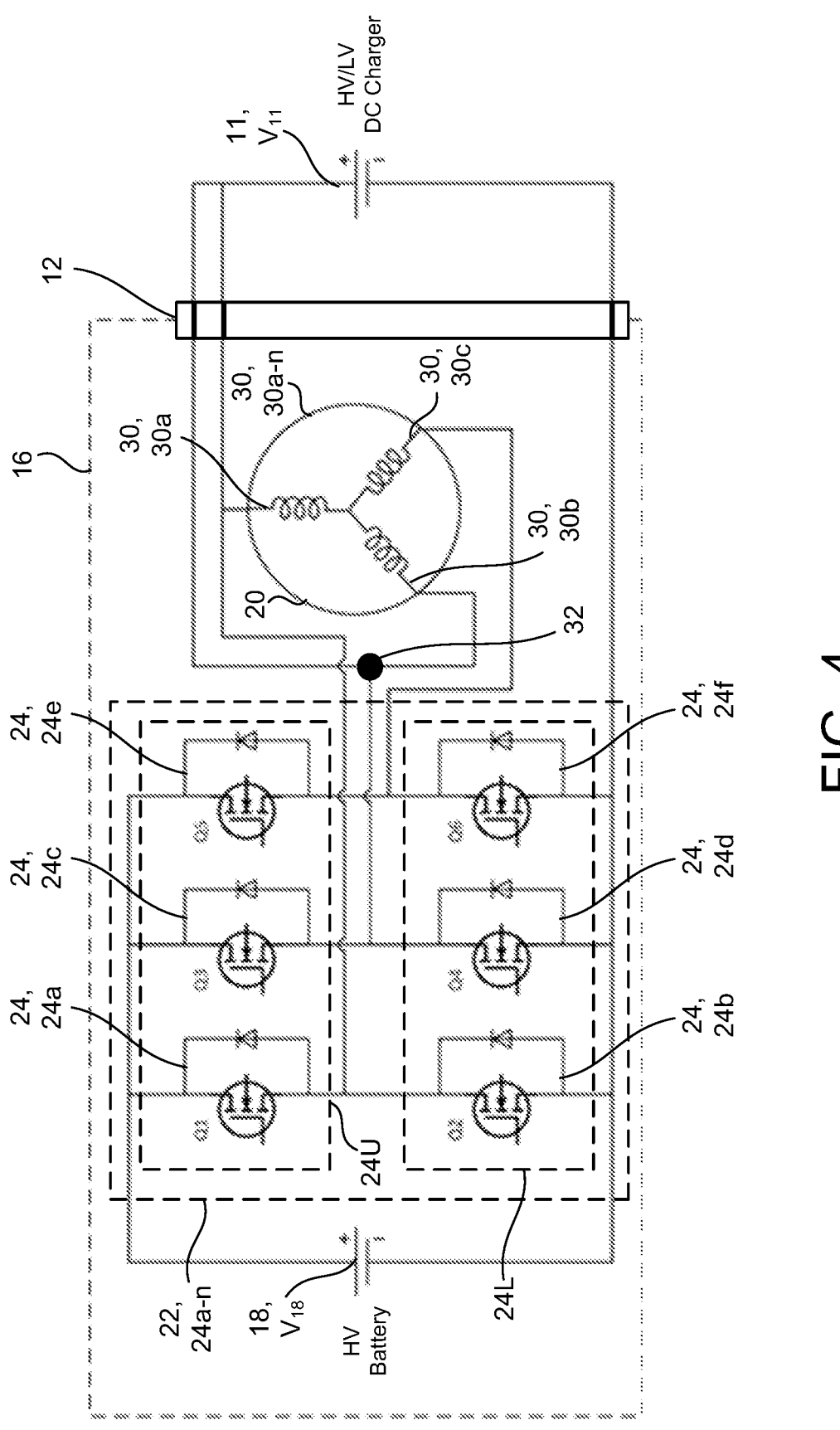

Referring to FIG. 4, in some implementations, the multi-phase traction motor 20 of the on-board charging circuit 16 includes two phases 30 electrically coupled to the charging source 11 and to the inverter 22 and one phase 30 electrically coupled to the inverter 22. That is, the first phase 30*a* is electrically coupled to the charging source 11 and to the inverter 22 between the first switching element 24*a* and the second switching element 24*b*. The second phase 30*b* is electrically coupled to the charging source 11 and to the inverter 22 between the third switching element 24*c* and the fourth switching element 24*d*. The third phase 30*c* is electrically coupled to the inverter 22 between the fifth switching element 24*e* and the sixth switching element 24*f*. The ESD 18 electrically coupled to the inverter 22 has a storage voltage V$_{18}$ of 800 volts (but may have any suitable storage voltage V$_{18}$), and the on-board charging circuit 16 may receive charging current from the charging source 11 having charging voltage V$_{11}$ that is less than the storage voltage V$_{18}$ (e.g., 400 volts) or that is greater than or equal to the storage voltage V$_{18}$ (e.g., 800 volts or more). In the example shown in FIG. 4, the charging source 11 provides DC charging current to the on-board charging circuit 16.

Furthermore, a switch 32 is electrically coupled to the second phase 30*b* of the multi-phase traction motor 20 to selectively adjust electrical connection of the second phase 30*b* between a first state and a second state. When the switch 32 is in the first state, the second phase 30*b* is electrically coupled to the charging source 11 via the charging port 12. When the switch 32 is in the second state, the second phase 30*b* is electrically coupled to the inverter 22. Thus, the switch 32 electrically connects the second phase 30*b* to either the charging source 11 or the inverter 22. The switch 32 may be disposed at or integrated with the second phase 30*b*, or disposed along the electrical connection between the second phase 30*b*, the charging source 11, and the inverter 22.

When operating in the fast charging mode, the control module 14 instructs the inverter 22 to operate the first switching element 24*a* and the third switching element 24*c* in the upper set of switching elements 24U in the ON state, and the control module 14 instructs the inverter 22 to operate the fifth switching element 24*e* in the upper set of switching elements 24U in the OFF state. Furthermore, when operating in the fast charging mode, the control module 14 instructs the inverter 22 to operate the second switching element 24*b*, the fourth switching element 24*d*, and the sixth switching element 24*f* in the lower set of switching elements 24L in the OFF state. Thus, the control module 14 detects that the charging voltage V$_{11}$ is greater than or equal to the storage voltage V$_{11}$ and instructs the inverter 22 accordingly so that the charging port 12 directly feeds charging current to the ESD 18 through the first switching element 24*a* and the third switching element 24*c* operating in the ON state.

When operating in the boost charging mode, the control module 14 instructs the inverter 22 to operate the fifth switching element 24*e* in the upper set of switching elements 24U and the sixth switching element 24*f* in the lower set of switching elements 24L in the PWM mode. In other words, the control module instructs the inverter 22 to selectively switch the fifth switching element 24*e* and the sixth switching element 24*f* between operating in the ON state and operating in the OFF state. Moreover when operating in the boost charging mode, the control module 14 instructs the inverter 22 to operate the first switching element 24*a* and the third switching element 24*c* in the upper set of switching elements 24U and the second switching element 24*b* and the fourth switching element 24*d* in the lower set of switching elements 24L to operate in the OFF state. Thus, the control module 14 detects that the charging voltage V$_{11}$ is less than the storage voltage V$_{11}$ and instructs the inverter 22 accordingly so that the voltage provided to the ESD 18 is boosted from (i.e., greater than) the charging voltage V$_{11}$ received at the charging port 12.

Figure 5:
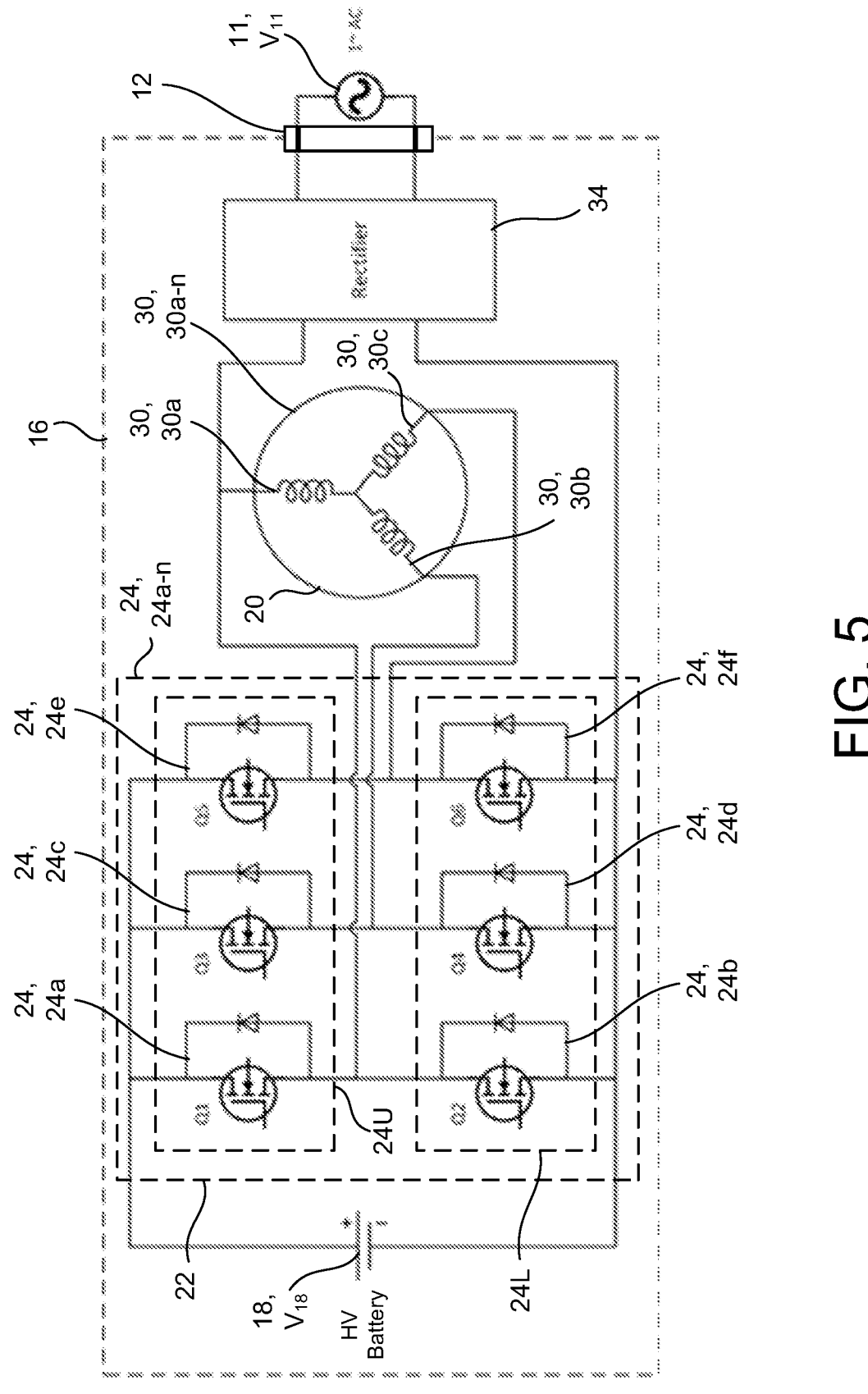

Referring to FIG. 5, in some implementations, the multi-phase traction motor 20 of the on-board charging circuit 16 includes one phase 30 electrically coupled to the charging source 11 and to the inverter 22 and two phases 30 electrically coupled to the inverter 22. That is, the first phase 30*a* is electrically coupled to the charging source 11 and to the inverter 22 between the first switching element 24*a* and the second switching element 24*b*, the second phase 30*b* is electrically coupled to the inverter 22 between the third switching element 24*c* and the fourth switching element 24*d*, and the third phase 30*c* is electrically coupled to the inverter 22 between the fifth switching element 24*e* and the sixth switching element 24*f* The ESD 18 electrically coupled to the inverter 22 has a storage voltage V$_{18}$ of 800 volts (but may have any suitable storage voltage V$_{18}$), and the on-board charging circuit 16 may receive charging current from the charging source 11 having charging voltage V$_{11}$ that is less than the storage voltage V$_{18}$ or that is greater than or equal to the storage voltage V$_{18}$.

In the example shown in FIG. 5, the charging source 11 provides single phase AC charging current. A rectifier 34, electrically coupled between the charging port 12 and the multi-phase traction motor 20, converts the AC from the charging source 11 to DC. Thus, the charging port 12 feeds the AC charging current from the charging source 11 to the rectifier 34 of the on-board charging circuit 16 and the rectifier 34 provides DC to the multi-phase traction motor 20 and the inverter 22.

When operating in the fast charging mode, the control module 14 instructs the inverter 22 to operate the first switching element 24*a* in the upper set of switching elements 24U in the ON state, and to operate the third switching element 24*c* and the fifth switching element 24*e* in the upper set of switching elements 24U in the OFF state. Furthermore, when operating in the fast charging mode, the control module 14 instructs the inverter 22 to operate the second switching element 24*b*, the fourth switching element 24*d*, and the sixth switching element 24*f* in the lower set of switching elements 24L in the OFF state. Thus, the control module 14 detects that the charging voltage V$_{11}$ is greater than or equal to the storage voltage V$_{11}$ and instructs the inverter 22 accordingly so that the converted charging current directly feeds from the rectifier 34 to the ESD 18 through the first switching element 24*a* operating in the ON state.

When operating in the boost charging mode, the control module 14 instructs the inverter 22 to operate the third switching element 24*c* and the fifth switching element 24*e* in the upper set of switching elements 24U and the fourth switching element 24*d* and the sixth switching element 24*f* in the lower set of switching elements 24L in the PWM mode. In other words, the control module 14 instructs the inverter 22 to selectively switch the third switching element 24*c*, the fourth switching element 24*d*, the fifth switching element 24*e*, and the sixth switching element 24*f* between operating in the ON state and operating in the OFF state. Moreover when operating in the boost charging mode, the control module 14 instructs the inverter 22 to operate the first switching element 24a in the upper set of switching elements 24U and the second switching element 24b in the lower set of switching elements 24L to operate in the OFF state. Thus, the control module 14 detects that the charging voltage $V_{11}$ is less than the storage voltage $V_{11}$ and instructs the inverter 22 accordingly so that the voltage provided to the ESD 18 is boosted from (i.e., greater than) the charging voltage $V_{11}$ received at the charging port 12.

Figure 6:
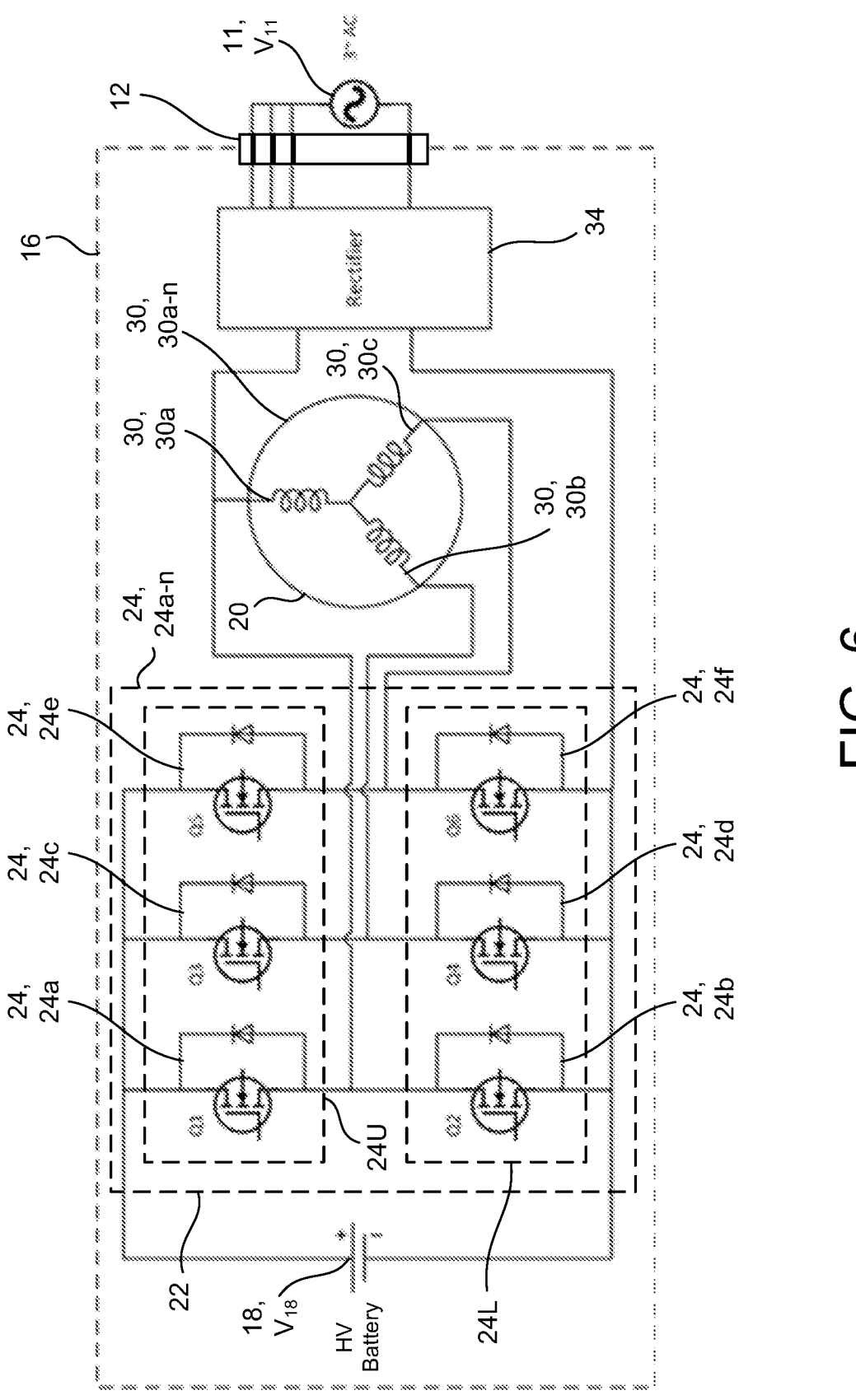

Referring to FIG. 6, in some implementations, the multi-phase traction motor 20 of the on-board charging circuit 16 includes one phase 30 electrically coupled to the charging source 11 and to the inverter 22 and two phases 30 electrically coupled to the inverter 22. That is, the first phase 30a is electrically coupled to the charging source 11 and to the inverter 22 between the first switching element 24a and the second switching element 24b, the second phase 30b is electrically coupled to the inverter 22 between the third switching element 24c and the fourth switching element 24d, and the third phase 30c is electrically coupled to the inverter 22 between the fifth switching element 24e and the sixth switching element 24fThe ESD 18 electrically coupled to the inverter 22 has a storage voltage $V_{18}$ of 800 volts (but may have any suitable storage voltage $V_{18}$), and the on-board charging circuit 16 may receive charging current from the charging source 11 having charging voltage $V_{11}$ that is less than the storage voltage $V_{18}$ or that is greater than or equal to the storage voltage $V_{18}$.

In the example shown in FIG. 6, the charging source 11 provides three phase AC charging current. The rectifier 34 is electrically coupled between the charging port 12 and the multi-phase traction motor 20 and converts the AC from the charging source 11 to DC. Thus, the charging port 12 feeds the AC charging current from the charging source 11 to the rectifier 34 of the on-board charging circuit 16 and the rectifier 34 provides DC to the multi-phase traction motor 20 and the inverter 22.

When operating in the fast charging mode, the control module 14 instructs the inverter 22 to operate the first switching element 24a in the upper set of switching elements 24U in the ON state, and to operate the third switching element 24c and the fifth switching element 24e in the upper set of switching elements 24U in the OFF state. Further when operating in the fast charging mode, the control module 14 instructs the inverter 22 to operate the second switching element 24b, the fourth switching element 24d, and the sixth switching element 24f in the lower set of switching elements 24L to operate in the OFF state. Thus, the control module 14 detects that the charging voltage $V_{11}$ is greater than or equal to the storage voltage $V_{11}$ and instructs the inverter 22 accordingly so that the converted charging current directly feeds from the rectifier 34 to the ESD 18 through the first switching element 24a operating in the ON state.

When operating in the boost charging mode, the control module 14 instructs the inverter 22 to operate the third switching element 24c and the fifth switching element 24e in the upper set of switching elements 24U and the fourth switching element 24d and the sixth switching element 24f in the lower set of switching elements 24L in the PWM mode. In other words, the control module 14 instructs the inverter 22 to selectively switch the third switching element 24c, the fourth switching element 24d, the fifth switching element 24e, and the sixth switching element 24f between operating in the ON state and operating in the OFF state. Moreover when operating in the boost charging mode, the control module 14 instructs the inverter 22 to operate the first switching element 24a in the upper set of switching elements 24U and the second switching element 24b in the lower set of switching elements 24L to operate in the OFF state. Thus, the control module 14 detects that the charging voltage $V_{11}$ is less than the storage voltage $V_{11}$ and instructs the inverter 22 accordingly so that the voltage provided to the ESD 18 is boosted from (i.e., greater than) the charging voltage $V_{11}$ received at the charging port 12.

Optionally, the charging source 11 may be an energy storage device of another electric vehicle. In such embodiments, the control module 14 detects the voltage $V_{11}$ of the charging source 11 and controls operation of the on-board charging circuit 16 based on the detected voltage $V_{11}$, as described herein.

Referring to FIGS. 7-10, the on-board charging circuit 16 may be bidirectional and thus operable to send power to an external energy sink 13, such as another vehicle or electric grid or isolated or islanded building, that is electrically coupled to the vehicle 10. For example, the energy sink 13 may be electrically coupled to the charging port 12 of the vehicle 10 or to a separate supply port or outlet 36 of the vehicle 10. The energy sink 13 may be electrified as a single-phase system (e.g., FIGS. 8 and 10) or a three-phase system (e.g., FIGS. 7 and 9).

Traditionally, bidirectional chargers are built as an independent module requiring independent switches and cooling systems. That is, in existing systems, an internal or external inductor and/or transformer is usually needed for bidirectional charging purposes, which adds materials cost.

In the illustrated example, a three-phase contactor 38 is used to separate the multi-phase traction motor 20 and windings 30 from the generated AC/DC voltage being transferred to the energy sink 13. That is, the outlet 36 and energy sink 13 are electrically coupled to the on-board charging circuit 16 between the multi-phase traction motor 20 and the inverter 22 and the three-phase contactor 38 is disposed between the multi-phase traction motor 20 and the electrical connection of the outlet 36 to electrically isolate the multi-phase traction motor 20 from the energy sink 13 when the ESD 18 electrically powers the energy sink 13.

Figure 7:
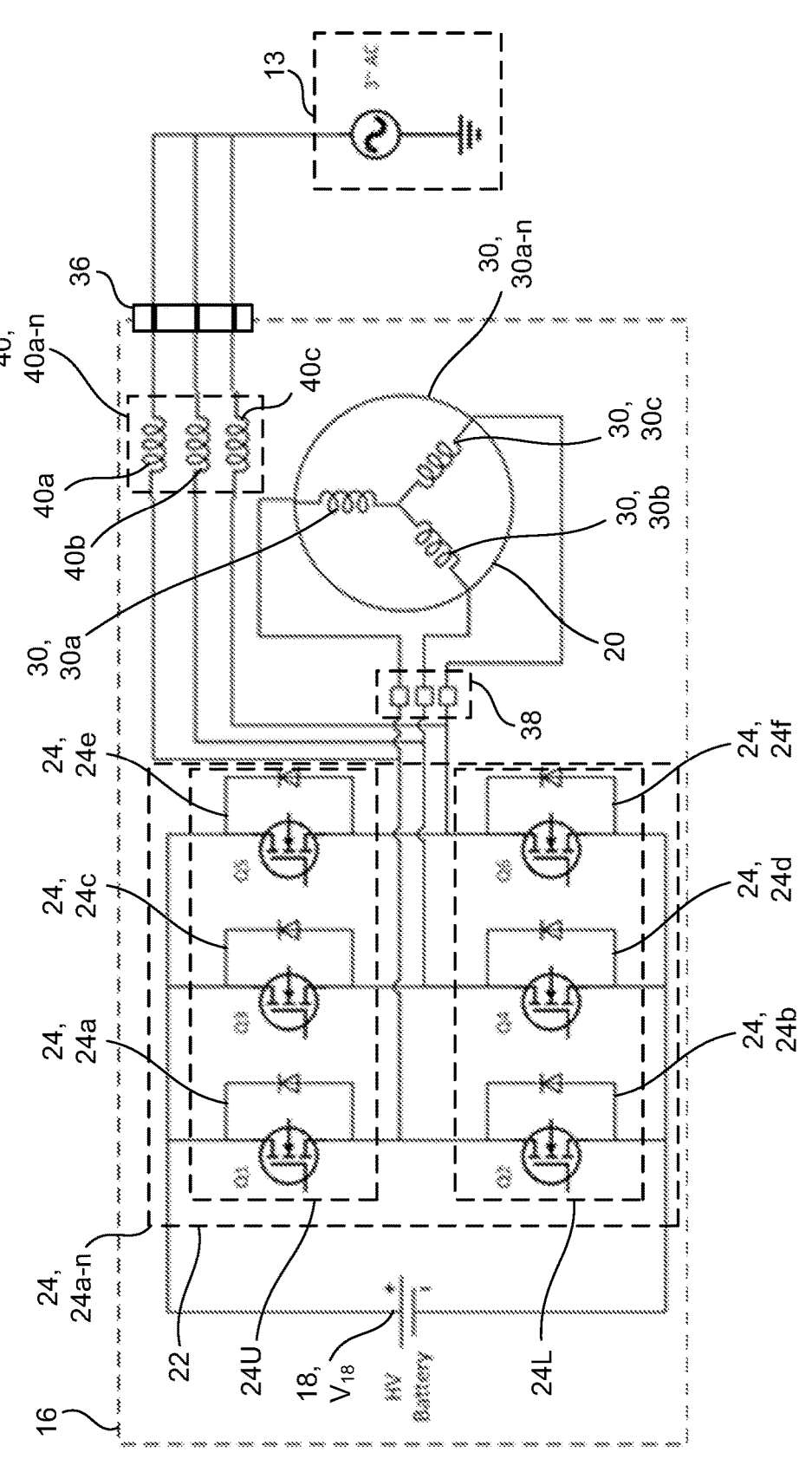

As shown in FIG. 7, the on-board charging circuit 16 is electrically connected to a grid-connected energy sink 13 receiving three-phase AC from the on-board charging circuit 16 via the outlet 36. For example, the on-board charging circuit 16 and ESD 18 may be utilized for electrification of a three-phase grid-connected residential or commercial area. The outlet 36 includes a first electric connection between the first switching element 24a and the second switching element 24b, a second electric connection between the third switching element 24c and the fourth switching element 24d, and a third electric connection between the fifth switching element 24e and the sixth switching element 24fOptionally, a respective resistor element 40, 40a—n may be disposed between each respective electric connection and the outlet 36, such as for detecting or controlling the energy draw of the energy sink 13. Thus, in the illustrated example, a first resistor 40a is disposed between the first switching element 24a, the second switching element 24b, and the outlet 36. A second resistor 40b is disposed between the third switching element 24c, the fourth switching element 24d, and the outlet 36. A third resistor 40c is disposed between the fifth switching element 24e, the sixth switching element 24f, and the outlet 36.

Figure 8:
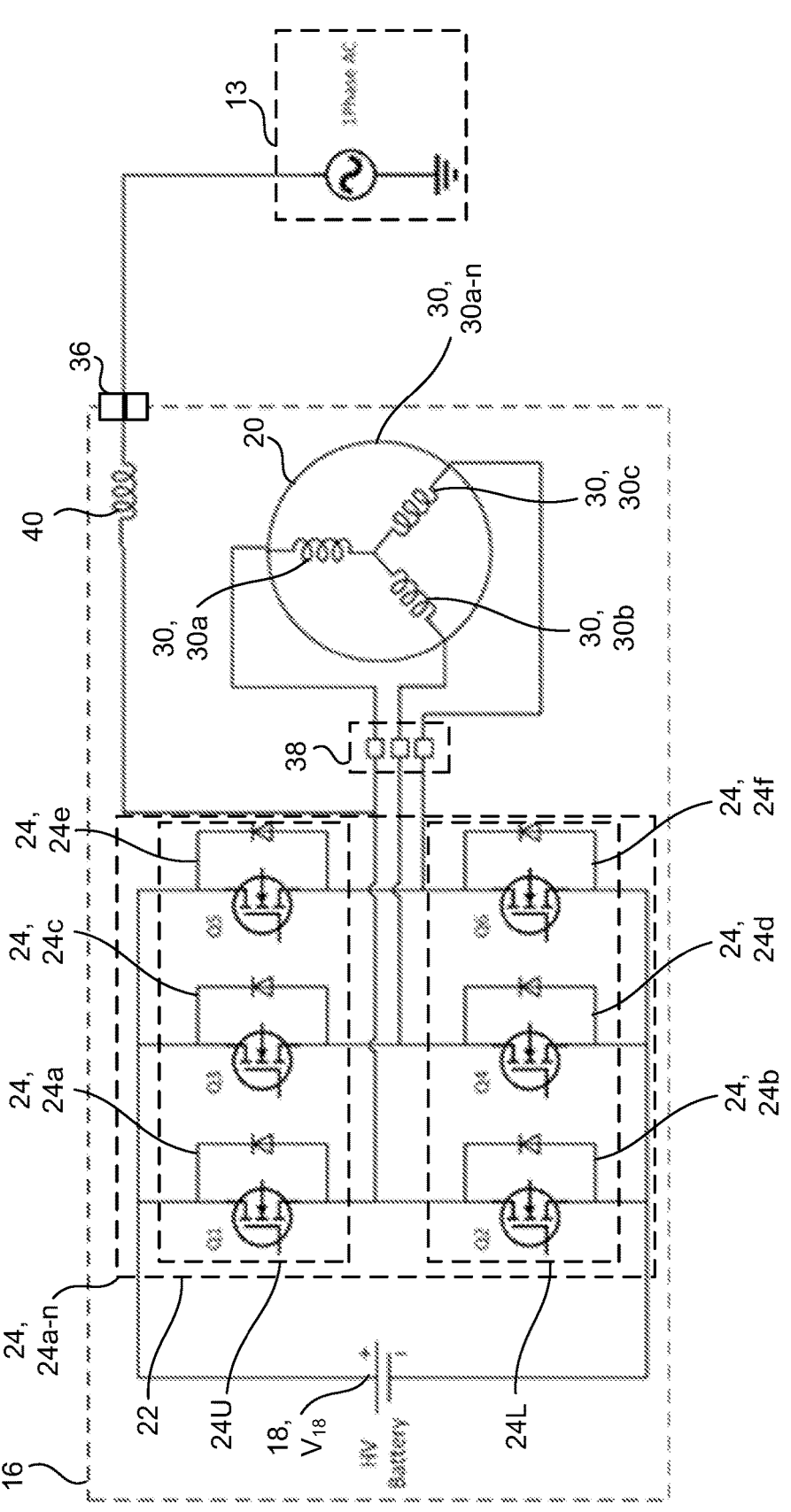

As shown in FIG. 8, the on-board charging circuit 16 is electrically connected to a grid-connected energy sink 13 receiving single-phase AC from the on-board charging circuit 16 via the outlet 36. For example, the on-board charging circuit 16 and ESD 18 may be utilized for electrification of a single-phase grid-connected residential or commercial area. The outlet 36 includes an electric connection between the first switching element 24a and the second switching element 24b. In the illustrated example, a resistor 40 is disposed between the first switching element 24a, the second switching element 24b, and the outlet 36.

Figure 9:
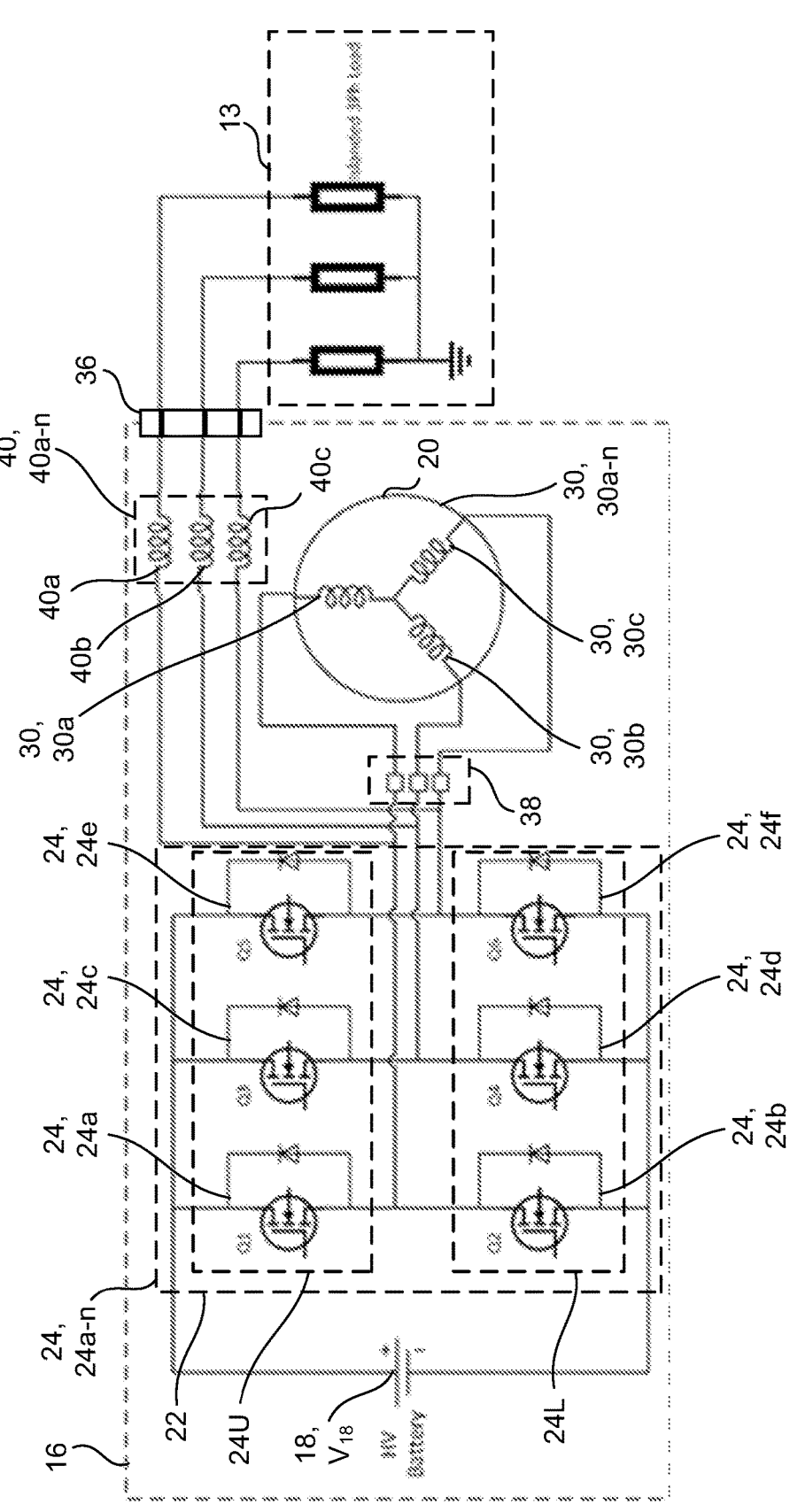

As shown in FIG. 9, the on-board charging circuit 16 is electrically connected to a standalone or isolated or islanded energy sink 13 receiving three-phase AC from the on-board charging circuit 16 via the outlet 36. For example, the on-board charging circuit 16 and ESD 18 may be utilized for electrification of a three-phase islanded residential or commercial area. The outlet 36 includes a first electric connection between the first switching element 24a and the second switching element 24b, a second electric connection between the third switching element 24c and the fourth switching element 24d, and a third electric connection between the fifth switching element 24e and the sixth switching element 24f In the illustrated example, a first resistor 40a is disposed between the first switching element 24a, the second switching element 24b, and the outlet 36. A second resistor 40b is disposed between the third switching element 24c, the fourth switching element 24d, and the outlet 36. A third resistor 40c is disposed between the fifth switching element 24e, the sixth switching element 24f, and the outlet 36.

Figure 10:
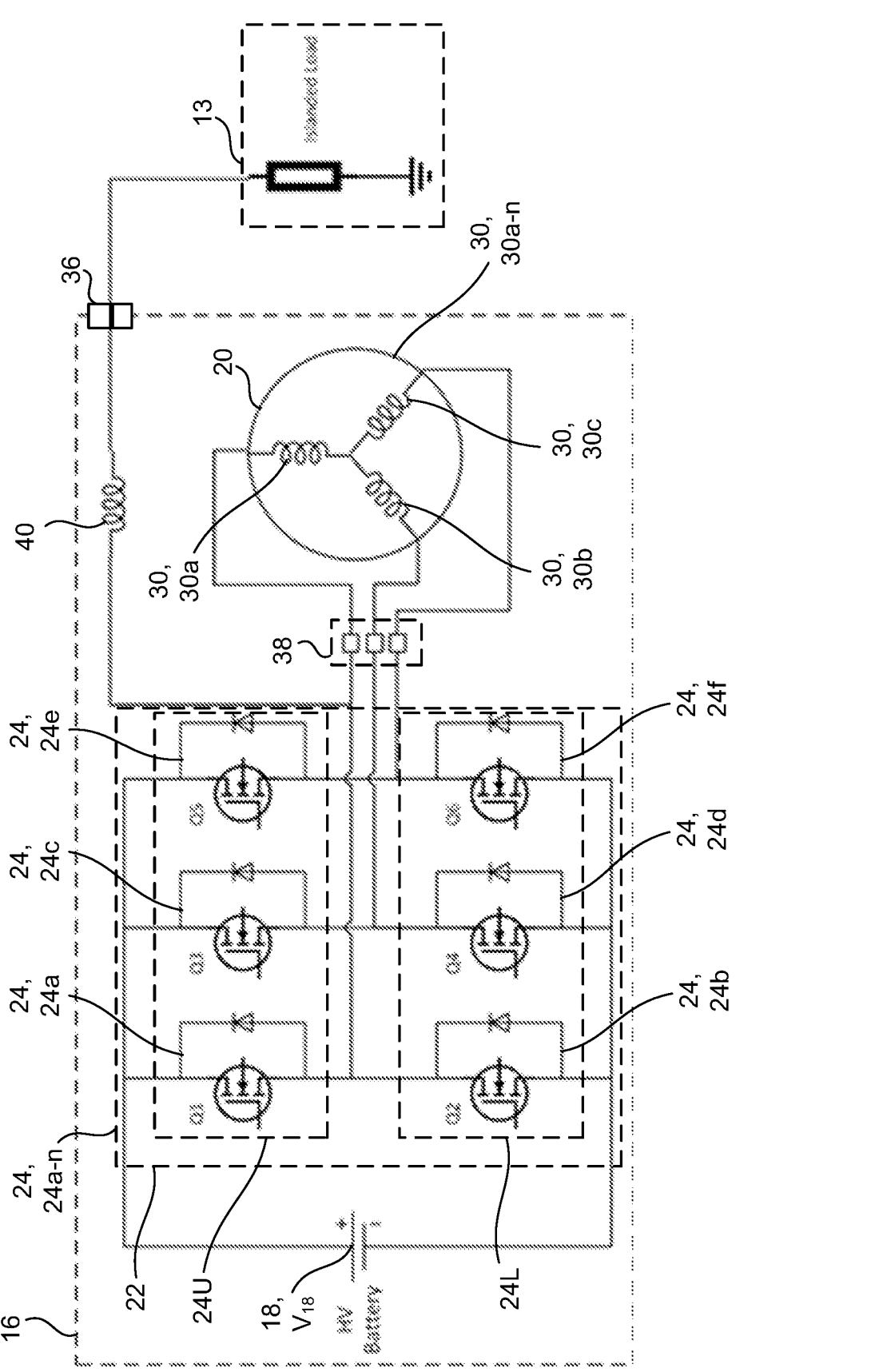

As shown in FIG. 10, the on-board charging circuit 16 is electrically connected to a standalone or isolated or islanded energy sink 13 receiving single-phase AC from the on-board charging circuit 16 via the outlet 36. For example, the on-board charging circuit 16 and ESD 18 may be utilized for electrification of a single-phase islanded residential or commercial area. The outlet 36 includes an electric connection between the first switching element 24a and the second switching element 24b. In the illustrated example, a resistor 40 is disposed between the first switching element 24a, the second switching element 24b, and the outlet 36.

The control module 14 may operate the inverter 22 and switching elements 24 accordingly to provide the desired current single-phase or three-phase AC from the ESD 18 to the energy sink 13. For grid-connected applications, the control module 14 syncs the on-board charging circuit 16 with the grid or energy sink 13 to achieve the proper switching angle and desired power transfer to the grid. For standalone electrification applications, the control module 14 will generate a reference AC voltage and provide current to maintain that generated reference voltage.

FIG. 11 provides a flowchart of an exemplary arrangement of operations for a method 1100 of controlling operation of the on-board charging circuit 16, where the on-board charging circuit 16 includes the multi-phase traction motor 20, the inverter 22 electrically coupled to the multi-phase traction motor 20, and the ESD 18 electrically coupled to the inverter 22. The data processing hardware 1210 of the control module 14 may perform the operations based on executing instructions stored on the memory hardware 1220 of the control module 14. At operation 1102, the method 1100 includes receiving an indication of a charging current at the on-board charging circuit 16 from a charging source 11 having a charging voltage $V_{11}$. For example, the control module 14 detects or senses the charging voltage $V_{11}$ at the charging port 12. At operation 1104, the method 1100 includes determining whether the charging voltage $V_{11}$ of the charging source 11 is greater than or equal to the storage voltage $V_{18}$ of the ESD 18. When the charging voltage $V_{11}$ of the charging source 11 is greater than or equal to the storage voltage $V_{18}$ of the ESD 18, the method 1100 includes, at operation 1106, instructing the inverter 22 to operate in the fast charging mode. Instructing the inverter 22 to operate in the fast charging mode includes instructing at least one switching element 24 in the upper set of switching elements 24U to operate in the ON state and instructing all of the switching elements 24 in the lower set of switching elements 24L to operate in the OFF state to cause fast charging of the ESD 18 using the charging current from the charging source 11. Optionally, when the charging voltage $V_{11}$ of the charging source 11 is less than the storage voltage $V_{18}$ of the ESD 18, the method 1100 includes instructing the inverter 22 to operate in the boost charging mode. Instructing the inverter 22 to operate in the boost charging mode includes instructing at least one switching element 24 in the upper set of switching elements 24U and at least one switching element 24 in the lower set of switching elements 24L to operate in the PWM mode to increase the voltage provided to charge the ESD 18 from the charging voltage $V_{11}$ of the charging source 11.

Thus, an electric or battery-powered vehicle includes an on-board charging circuit providing an integrated charging and inverter device. The inverter directly connects the charger with voltages above the voltage of the battery pack to charge the battery. For a charger with voltages lower than the battery's voltage, the motor windings and inverter provide a boost charger to charge the battery. The control module detects the voltage and controls the switching. Thus, the on-board charging circuit provides charging for the battery with different DC and AC chargers having different voltages via the same charging port, thereby eliminating the need for an onboard DC to DC charger, which would introduce additional electronic components, extra cost, space, and weight to the vehicle.

Figure 12:
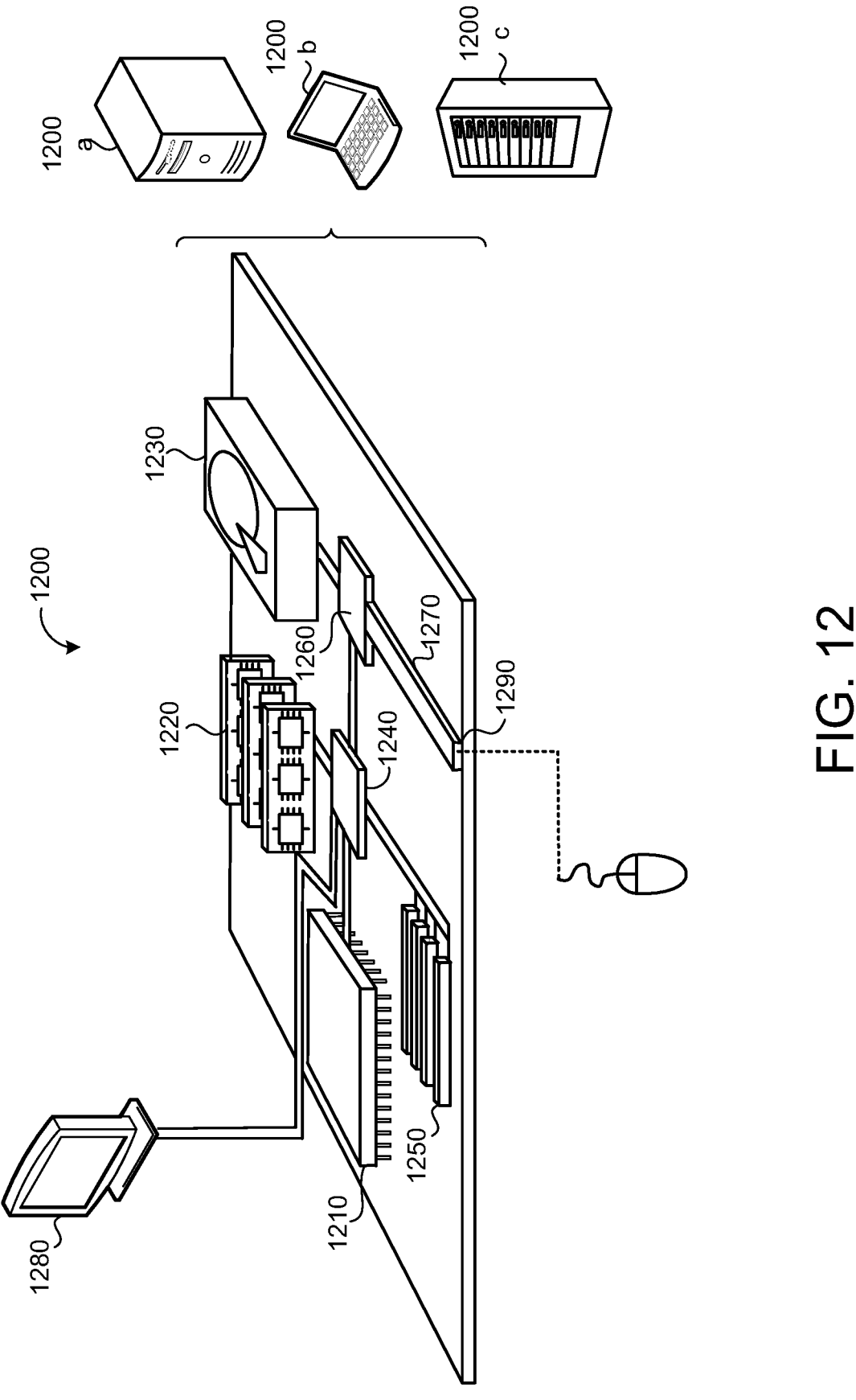
FIG. 12 is schematic view of an example computing device that may be used to implement the systems and methods described herein.

FIG. 12 is schematic view of an example computing device 1200 that may be used to implement the systems and methods described in this document. The computing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1200 includes a processor 1210, memory 1220, a storage device 1230, a high-speed interface/controller 1240 connecting to the memory 1220 and high-speed expansion ports 1250, and a low speed interface/controller 1260 connecting to a low speed bus 1270 and a storage device 1230. Each of the components 1210, 1220, 1230, 1240, 1250, and 1260, are interconnected using various busses, and may be mounted on a common motherboard or in other manners as appropriate. The processor 1210 can process instructions for execution within the computing device 1200, including instructions stored in the memory 1220 or on the storage device 1230 to display graphical information for a graphical user interface (GUI) on an external input/output device, such as display 1280 coupled to high speed interface 1240. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1220 stores information non-transitorily within the computing device 1200. The memory 1220 may be a computer-readable medium, a volatile memory unit(s), or non-volatile memory unit(s). The non-transitory memory 1220 may be physical devices used to store programs (e.g., sequences of instructions) or data (e.g., program state information) on a temporary or permanent basis for use by the computing device 1200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1230 is capable of providing mass storage for the computing device 1200. In some implementations, the storage device 1230 is a computer-readable medium. In various different implementations, the storage device 1230 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1220, the storage device 1230, or memory on processor 1210.

The high speed controller 1240 manages bandwidth-intensive operations for the computing device 1200, while the low speed controller 1260 manages lower bandwidth-intensive operations. Such allocation of duties is exemplary only. In some implementations, the high-speed controller 1240 is coupled to the memory 1220, the display 1280 (e.g., through a graphics processor or accelerator), and to the high-speed expansion ports 1250, which may accept various expansion cards (not shown). In some implementations, the low-speed controller 1260 is coupled to the storage device 1230 and a low-speed expansion port 1290. The low-speed expansion port 1290, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1200a or multiple times in a group of such servers 1200a, as a laptop computer 1200b, or as part of a rack server system 1200c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:

receiving an indication of a charging current received at an on-board charging circuit of a vehicle from a source having a charging voltage, the on-board charging circuit comprising:

a multi-phase traction motor;

an inverter electrically coupled to the multi-phase traction motor, the inverter comprising an first set of switching elements and a second set of switching elements; and an energy storage device electrically coupled to the inverter, the energy storage device having a storage voltage;

determining whether the charging voltage of the source is greater than or equal to the storage voltage of the energy storage device;

when the charging voltage of the source is greater than or equal to the storage voltage, instructing the inverter to operate in a fast charging mode by instructing at least one switching element in the first set of switching elements to operate in an on state and all of the switching elements in the second set of switching elements to operate in an off state to cause fast charging of the energy storage device using the charging current from the source; and when the charging voltage of the source is less than the storage voltage, instructing the inverter to operate in a boost charging mode by:

instructing a first switching element in the first set of switching elements and a second switching element in the second set of switching elements to each operate in the off state; and instructing a third switching element in the first set of switching elements, a fourth switching element in the second set of switching elements, a fifth switching element in the first set of switches, and a sixth switching element in the second set of switching elements to operate in a pulse width modulation mode (PWM mode), wherein the third, fourth, fifth, and sixth switching elements are selectively switched between operating in the on state and the off state.

2. The method of claim 1, wherein:

the vehicle comprises a charging port, the charging port feeding the charging current to the on-board charging circuit; and the multi-phase traction motor comprises:

a first phase electrically coupled to the charging port and electrically coupled to the inverter between the first switching element in the first set of switching elements and the second switching element in the second set of switching elements of the inverter;

a second phase electrically coupled to the inverter between the third switching element in the first set of switching elements and the fourth switching element in the second set of switching elements of the inverter; and a third phase electrically coupled to the inverter between the fifth switching element in the first set of switching elements and the sixth switching element in the second set of switching elements of the inverter.

3. The method of claim 2, wherein instructing the inverter to operate in the fast charging mode comprises:

instructing the first switching element in the first set of switching elements to operate in the on state;

instructing the third and fifth switching elements in the first set of switching elements to each operate in the off state; and instructing the second, fourth, and sixth switching elements in the second set of switching elements to each operate in the off state.

4. The method of claim 1, wherein: the vehicle comprises a charging port, the charging port feeding the charging current to the on-board charging circuit; and the multi-phase traction motor comprises: a first phase electrically coupled to the charging port of the vehicle and electrically coupled to the inverter between a first switching element in the first set of switching elements and a second switching element in the second set of switching elements of the inverter; a second phase electrically coupled to the charging port and electrically coupled to the inverter between a third switching element in the first set of switching elements and a fourth switching element in the second set of switching elements of the inverter; and a third phase electrically coupled to the inverter between a fifth switching element in the first set of switching elements and a sixth switching element in the second set of switching elements of the inverter.

5. The method of claim 4, wherein instructing the inverter to operate in the fast charging mode comprises: instructing the first switching element and the third switching element in the first set of switching elements to operate in the on state; instructing the fifth switching element in the first set of switching elements to operate in the off state; and instructing the second, fourth, and sixth switching elements in the second set of switching elements to each operate in the off state.

6. The method of claim 4, wherein the operations further comprise, when the charging voltage of the source is less than the storage voltage, instructing the inverter to operate in a boost charging mode by: instructing the fifth switching element in the first set of switching elements and the sixth switching element in the second set of switching elements to operate in a pulse width modulation mode (PWM mode), wherein the fifth and sixth switching elements are selectively switched between operating in the on state and the off state; and instructing the first switching element and the third switching element in the first set of switching elements to each operate in the off state.

7. The method of claim 4, wherein a switch is disposed at the second phase of the multi-phase traction motor, the switch selectively adjusting the second phase between:
   a first state, wherein the second phase is electrically coupled to the charging port; and
   a second state, wherein the second phase is electrically coupled to the inverter.

8. The method of claim 1, wherein:
   the vehicle comprises a charging port electrically coupled to the on-board charging circuit; and
   receiving the charging current from the source comprises:
      receiving an alternating current (AC) at the on-board charging circuit, the AC received from the source via the charging port; and
      converting, using a rectifier electrically coupled between the charging port and the multi-phase traction motor, the AC to direct current (DC).

9. The method of claim 1, wherein receiving the charging current from the source comprises receiving a direct current (DC) from the source via a charging port, the charging port electrically coupling the on-board charging circuit to the source.

10. The method of claim 1, wherein the switching elements in the first set of switching elements and the second set of switching elements comprise metal-oxide-semiconductor field-effect transistors or insulated-gate bipolar transistors.

11. The method of claim 1, wherein the multi-phase traction motor comprises one of:
   a brushless direct current (DC) motor;
   a brushed DC motor;
   an induction motor;
   a doubly fed induction motor; or
   a synchronous reluctance motor.

12. The method of claim 1, wherein the on-board charging circuit comprises a bidirectional charging circuit configured to, when the on-board charging circuit is electrically coupled to an energy sink, provide energy from the energy storage device to the energy sink.

13. A vehicle comprising:
   an on-board charging circuit comprising:
      a multi-phase traction motor;

an inverter electrically coupled to the multi-phase traction motor, the inverter comprising an first set of switching elements and a second set of switching elements; and
      an energy storage device electrically coupled to the inverter, the energy storage device having a storage voltage; and
   memory hardware storing instructions that, when executed on data processing hardware in communication with the memory hardware, cause the data processing hardware to perform operations comprising:
      receiving an indication of a charging current received at the on-board charging circuit from a source, the source having a charging voltage;
      determining whether the charging voltage of the source is greater than or equal to the storage voltage of the energy storage device;
      when the charging voltage of the source is greater than or equal to the storage voltage, instructing the inverter to operate in a fast charging mode by instructing at least one switching element in the first set of switching elements to operate in an on state and all of the switching elements in the second set of switching elements to operate in an off state to cause fast charging of the energy storage device using the charging current from the source; and
      when the charging voltage of the source is less than the storage voltage, instructing the inverter to operate in a boost charging mode by:
         instructing a first switching element in the first set of switching elements and a second switching element in the second set of switching elements to each operate in the off state; and
         instructing a third switching element in the first set of switching elements, a fourth switching element in the second set of switching elements, a fifth switching element in the first set of switches, and a sixth switching element in the second set of switching elements to operate in a pulse width modulation mode (PWM mode), wherein the third, fourth, fifth, and sixth switching elements are selectively switched between operating in the on state and the off state.

14. The vehicle of claim 13, wherein:
   the vehicle comprises a charging port, the charging port feeding the charging current to the on-board charging circuit; and
   the multi-phase traction motor comprises:
      a first phase electrically coupled to the charging port and electrically coupled to the inverter between the first switching element in the first set of switching elements and the second switching element in the second set of switching elements of the inverter;
      a second phase electrically coupled to the inverter between the third switching element in the first set of switching elements and the fourth switching element in the second set of switching elements of the inverter; and
      a third phase electrically coupled to the inverter between the fifth switching element in the first set of switching elements and the sixth switching element in the second set of switching elements of the inverter.

15. The vehicle of claim 14, wherein instructing the inverter to operate in the fast charging mode comprises:
   instructing the first switching element in the first set of switching elements to operate in the on state;

21 instructing the third and fifth switching elements in the first set of switching elements to each operate in the off state; and instructing the second, fourth, and sixth switching elements in the second set of switching elements to each operate in the off state.

16. The vehicle of claim 13, wherein: the vehicle comprises a charging port, the charging port feeding the charging current to the on-board charging circuit; and the multi-phase traction motor comprises: a first phase electrically coupled to the charging port of the vehicle and electrically coupled to the inverter between a first switching element in the first set of switching elements and a second switching element in the second set of switching elements of the inverter; a second phase electrically coupled to the charging port and electrically coupled to the inverter between a third switching element in the first set of switching elements and a fourth switching element in the lower set of switching elements of the inverter; and a third phase electrically coupled to the inverter between a fifth switching element in the first set of switching elements and a sixth switching element in the second set of switching elements of the inverter.

17. The vehicle of claim 16, wherein instructing the inverter to operate in the fast charging mode comprises: instructing the first switching element and the third switching element in the first set of switching elements to operate in the on state; instructing the fifth switching element in the first set of switching elements to operate in the off state; and instructing the second, fourth, and sixth switching elements in the second set of switching elements to each operate in the off state.

18. The vehicle of claim 16, wherein the operations further comprise, when the charging voltage of the source is less than the storage voltage, instructing the inverter to operate in a boost charging mode by: instructing the fifth switching element in the first set of switching elements and the sixth switching element in the second set of switching elements to operate in a pulse width modulation mode (PWM mode), wherein the fifth and sixth switching elements are selectively switched between operating in the on state and the off state; and instructing the first switching element and the third switching element in the first set of switching elements to each operate in the off state.

19. The vehicle of claim 16, wherein a switch is disposed at the second phase of the multi-phase traction motor, the switch selectively adjusting the second phase between:

a first state, wherein the second phase is electrically coupled to the charging port; and a second state, wherein the second phase is electrically coupled to the inverter.

20. The vehicle of claim 13, wherein:

the vehicle comprises a charging port electrically coupled to the on-board charging circuit; and receiving the charging current from the source comprises:

receiving an alternating current (AC) at the on-board charging circuit, the AC received from the source via the charging port; and converting, using a rectifier electrically coupled between the charging port and the multi-phase traction motor, the AC to direct current (DC).

21. The vehicle of claim 13, wherein receiving the charging current from the source comprises receiving a direct current (DC) from the source via a charging port, the charging port electrically coupling the on-board charging circuit to the source.

22. The vehicle of claim 13, wherein the switching elements in the first set of switching elements and the second set of switching elements comprise metal-oxide-semiconductor field-effect transistors or insulated-gate bipolar transistors.

23. The vehicle of claim 14, wherein the multi-phase traction motor comprises one of:

a brushless direct current (DC) motor;

a brushed DC motor, an induction motor;

a doubly fed induction motor; or a synchronous reluctance motor.

24. The method of claim 13, wherein the on-board charging circuit comprises a bidirectional charging circuit configured to, when the on-board charging circuit is electrically coupled to an energy sink, provide energy from the energy storage device to the energy sink.

* * * * *